United States Patent
Stauder et al.

(10) Patent No.: US 11,678,025 B2
(45) Date of Patent: Jun. 13, 2023

(54) METHODS FOR PROCESSING AUDIO AND/OR VIDEO CONTENTS AND CORRESPONDING SIGNAL, DEVICES, ELECTRONIC ASSEMBLY, SYSTEM, COMPUTER READABLE PROGRAM PRODUCTS AND COMPUTER READABLE STORAGE MEDIA

(71) Applicant: InterDigital VC Holdings, Inc., Wilmington, DE (US)

(72) Inventors: Jurgen Stauder, Montreuil/Ille (FR); Erik Reinhard, Hédé-Bazouges (FR); Catherine Serre, Saint Gregoire (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/415,830

(22) PCT Filed: Dec. 17, 2019

(86) PCT No.: PCT/US2019/066861
§ 371 (c)(1),
(2) Date: Jun. 18, 2021

(87) PCT Pub. No.: WO2020/131877
PCT Pub. Date: Jun. 25, 2020

(65) Prior Publication Data
US 2022/0060799 A1    Feb. 24, 2022

(30) Foreign Application Priority Data

Dec. 20, 2018   (EP) .................................... 18306754

(51) Int. Cl.
*H04N 21/6547*   (2011.01)
(52) U.S. Cl.
CPC .............................. *H04N 21/6547* (2013.01)

(58) Field of Classification Search
CPC .................................................. H04N 21/6547
See application file for complete search history.

(56) References Cited

U.S. PATENT DOCUMENTS

| | | | |
|---|---|---|---|
| 9,860,504 B2 | 1/2018 | Liu et al. | |
| 2015/0245050 A1* | 8/2015 | Tourapis | H04N 5/20 |
| | | | 375/240.02 |

(Continued)

FOREIGN PATENT DOCUMENTS

| | | |
|---|---|---|
| WO | WO 2015130797 A1 | 9/2015 |
| WO | WO 2016178549 A1 | 11/2016 |

(Continued)

OTHER PUBLICATIONS

Bordes et al, "Overview of Color Gamut Scalability", IEEE Transactions on Circuits and Systems for Video Technology, vol. 27, No. 7, Jul. 2017, pp. 1580-1594.

(Continued)

*Primary Examiner* — Yassin Alata
(74) *Attorney, Agent, or Firm* — Condo Roccia Koptiw LLP

(57) ABSTRACT

The disclosure relates to a method including applying a first format modification to an audio and video input content in a first format to output a content complying with a second format, information about the first format modification being associated to the output content. The disclosure also relates to a method including obtaining an audio and video input content complying with an input format and information about a first format modification applied to the input content and determining a second format modification to apply to the input content by taking account of the first format modification. It also relates to corresponding signal, devices, electronic assembly, system, computer readable program products and storage media.

20 Claims, 7 Drawing Sheets

(56) References Cited

U.S. PATENT DOCUMENTS

| | | |
|---|---|---|
| 2017/0048561 A1 | 2/2017 | Oh et al. |
| 2017/0070735 A1 | 3/2017 | Ramasubramonian et al. |
| 2017/0078706 A1 | 3/2017 | Van Der Vleuten et al. |
| 2017/0186141 A1 | 6/2017 | Ha et al. |
| 2017/0263211 A1 | 9/2017 | Miller et al. |

FOREIGN PATENT DOCUMENTS

| | | |
|---|---|---|
| WO | WO 2017141316 A1 | 8/2017 |
| WO | WO 2018178367 A1 | 10/2018 |

OTHER PUBLICATIONS

Azimi et al., "A Color Gamut Mapping Scheme for Backward Compatible UHD Video Distribution", IEEE ICC 2017 Communications Software, Services, and Multimedia Applications Symposium, Paris, France, May 21, 2017, 5 pages.

Anonymous, "Colour gamut conversion from Recommendation ITU-R BT.2020 to Recommendation ITU-R BT.709", International Telecommunication Union, ITU-R Radiocommunication Sector of ITU, Report ITU-R BT.2407-0, Oct. 2017, 47 pages.

Anonymous, "Parameter values for the HDTV Standards for Production and International Programme Exchange", International Telecommunication Union, ITU-R Radiocommunication Sector of ITU, Recommendation ITU-R BT.709-6, Jun. 2015, 19 pages.

Xu et al., "Color gamut mapping between small and large color gamuts: part II. gamut extension", Optics Express, vol. 26, No. 13, Jun. 25, 2018, 15 pages.

English Translation of WO2017141316A1, "Imaging Apparatus and color correction method".

Anonymous, "Parameter Values for Ultra-high Definition Television Systems for Production and International Programme Exchange", International Telecommunication Union, ITU-R Radiocommunication Sector of ITU, Recommendation ITU-R BT.2020-2, Oct. 2015, 8 pages.

Anonymous, "Colour conversion from Recommendation ITU-R BT.709 to Recommendation ITU-R BT.2020", International Telecommunication Union, ITU-R Radiocommunication Sector of ITU, Recommendation ITU-R BT.2087-0, Oct. 2015, 11 pages.

English Translation of WO2016178549A1, "A broadcast signal transmitting device, a broadcast signal receiving device, a broadcast signal transmitting device, and a broadcast signal receiving method."

Anonymous, "Operational practices in HDR television production", International Telecommunication Union, ITU-R Radiocommunication Sector of ITU, Recommendation ITU-R BT.2408-1, Apr. 2018, 35 pages.

Anonymous, "Image Parameter Values for High Dynamic Range Television for Use in Production and International Programme Exchange", International Telecommunication Union, Radiocommunication Sector of ITU, Recommendation ITU-R BT.2100-2, Jul. 2018, 15 pages.

* cited by examiner

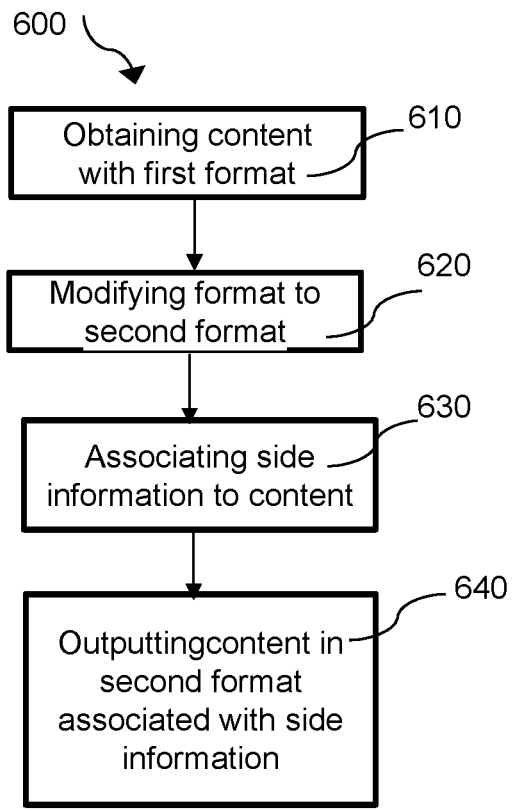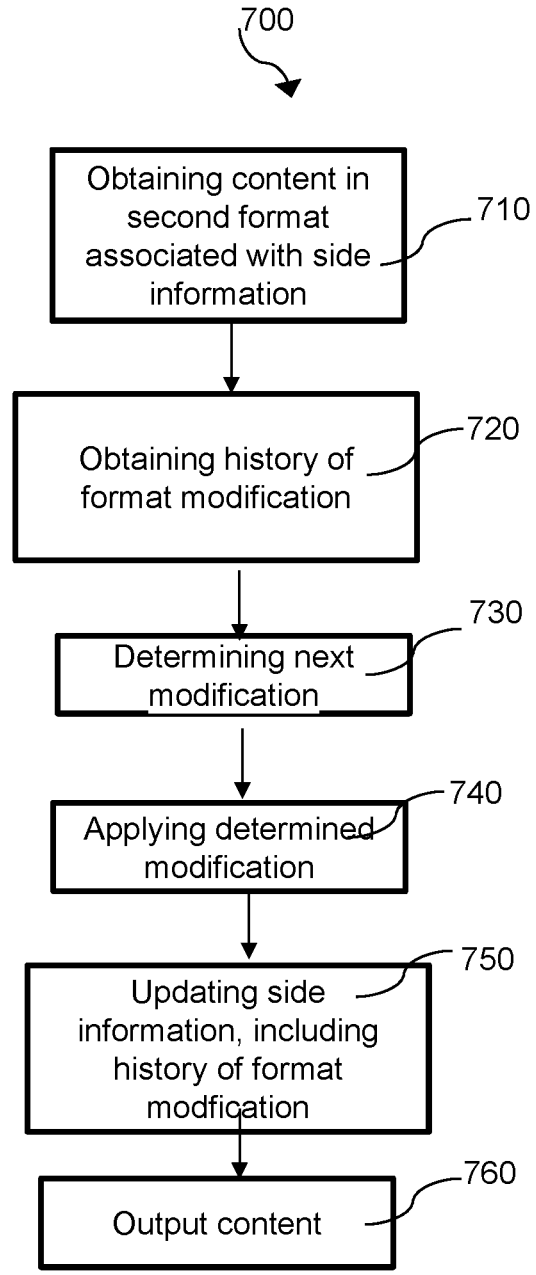
Figure 6
Figure 7

METHODS FOR PROCESSING AUDIO AND/OR VIDEO CONTENTS AND CORRESPONDING SIGNAL, DEVICES, ELECTRONIC ASSEMBLY, SYSTEM, COMPUTER READABLE PROGRAM PRODUCTS AND COMPUTER READABLE STORAGE MEDIA

This application claims the benefit, under 35 U.S.C. § 371 of Patent Cooperation Treaty Application No. PCT/US2019/066861, filed Dec. 17, 2019, which was published in accordance with PCT Article 21(2) on Jun. 25, 2020, in English, and which claims the benefit of European Patent Application No. 18306754.5, filed Dec. 20, 2018.

TECHNICAL FIELD

The present disclosure relates to the technical field of processing of audio and/or video contents and to the transformation of such contents between formats of different quality. Methods for processing audio and/or video streams and corresponding signal, devices, electronic assembly, system, computer readable program products and computer readable storage media are described.

BACKGROUND ART

In audio-visual production and distribution, various formats are defined that notably differ in terms of quality of signal representation. The quality of a signal representation is often assessed by the dynamic range (DR) (or dynamic ranges for more than one-dimension) associated with the signal representation, or in other words by the ratio between the largest and the smallest possible values for a signal using the signal representation. Indeed, a larger range of values permits to represent more fluctuations of a signal and thus increase the quality of the signal.

For instance, in the exemplary field of video processing, depending on the dynamic range associated with a signal representation, the signal representation can permit greater or lower luminance variations, or narrower or larger range of colors, thus providing more or less flexibility, precision and/or contained details for the resulting signals.

However, the larger is the dynamic range(s) of a signal representation, the higher is the coding cost of the signal and thus the need in terms on storage and/or transmission bandwidth. This issue is more important for contents like audio and/or video contents, representing a huge amount of data. Thus, the format, or signal representation, accepted by an electronic device, notably an electronic device processing audio and/or video contents, is very dependent of its storage and/or capabilities. In the technical field of production and/or distribution of audio and/or video contents, many electronic devices can be involved in the processing of an audio and/or video signal, or content, in view of its consumption by a user: the whole processing can involve for instance one or several audio and/or video acquiring devices (like cameras and/or microphones), storing devices, encoding devices, transmitting devices, receiving devices, decoding devices and output devices (like displays or speakers). As those devices can be of heterogeneous types, can have different storing and/or processing capabilities, and can be more or less recent (thus complying with more or less recent standard formats), they can require different formats for signal representation. Additionally, such different formats of signal representation can correspond to different low and/or upper limits values. Thus, the format of a content can be modified successively several times, for being adapted to successive processing devices, before being consumed by a user. However, the successive transformations of a content in different formats can lead to some artifacts that can be noticeable at a user's perspective.

So, there is need for a solution that enhances the user experience of a user consuming an audio and/or video content.

SUMMARY

The present principles enable at least one of the above disadvantages to be resolved by proposing a method comprising:
   obtaining an audio and/or video input content complying with a first format, the first format providing a representation of data in a first range of possible values;
   applying a first format modification to the input content, the first format modification being adapted to provide an output content complying with a second format, the second format providing a representation of data in a second range of possible values;
   associating with the output content side information comprising a designation of the first format modification, wherein the first format modification includes at least an up-conversion, a down-conversion, a mapping, a clipping or a combination thereof, the side information comprising data representative of range operations performed between values of the first and second ranges by the first format modification.

The method can notably be implemented in an electronic device.

The present disclosure further relates, in at least some embodiments, to an electronic device comprising at least one processor, the at least one processor being adapted for:
   obtaining an audio and/or video input content complying with a first format, the first format providing a representation of data in a first range of values;
   applying a first format modification to the input content, the first format modification being adapted to provide an output content complying with a second format, the second format providing a representation of data in a second range of values;
   associating with the output content side information comprising a designation of the first format modification, wherein the first format modification includes at least an up-conversion, a down-conversion, a mapping, a clipping or a combination thereof, the first format modification being representative of range operations performed between values of the first and second ranges by the first format modification.

According to another aspect, the present disclosure further relates to a method comprising:
   obtaining an audio and/or video input content, the audio and/or video input content complying with an input format, the input format providing a representation of data in an input range of values,
   obtaining side information associated with the input content and comprising a designation of at least one first format modification, the first format modification including at least an up-conversion, a down-conversion, a mapping, a clipping or a combination thereof, the side information being adapted to represent range operations performed between values of a first range and values of a second range by the first format modification;

determining a second format modification to apply to the input content by taking account of the first format modification of the associated side information.

The method can notably be implemented in an electronic device.

The present disclosure further relates to an electronic device comprising at least one processor, the at least one processor being adapted for:

obtaining an audio and/or video input content, the audio and/or video input content complying with an input format, the input format providing a representation of data in an input range of values, obtaining side information associated with the input content and comprising a designation of at least one first format modification, the first format modification including at least an up-conversion, a down-conversion, a mapping, a clipping or a combination thereof, the side information being adapted to represent range operations performed between values of a first range and values of a second range by the first format modification; determining a second format modification to apply to the input content by taking account of the first format modification of the associated side information.

LIST OF DRAWINGS

The present disclosure can be better understood, and other specific features and advantages can emerge upon reading the following description, the description referring to the annexed drawings wherein:

FIG. 6 illustrates an embodiment of one of the methods of the present disclosure performed, for instance, in the electronic device of FIGS. 1 and/or 4;

FIG. 7 illustrates an embodiment of one of the methods of the present disclosure performed, for instance, in the electronic device of FIGS. 1 and/or 5.

Figure 1:
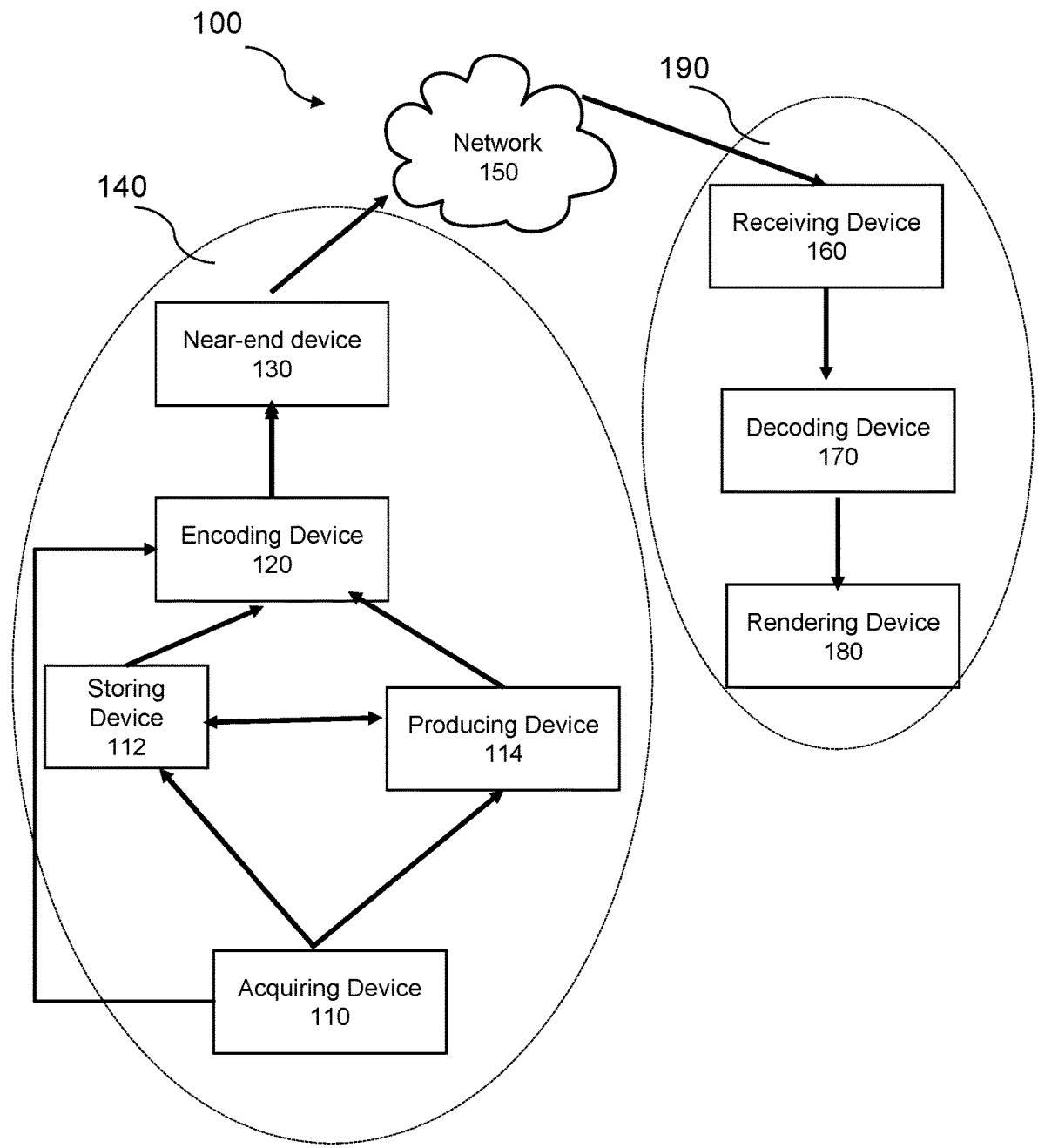
FIG. 1 shows an example of a distribution system according to an exemplary embodiment of the present disclosure.

It is to be noted that the drawings illustrate exemplary embodiments and that the embodiments of the present disclosure are not limited to the illustrated embodiments. Notably, as obvious for the one of the skills in the art, the different embodiments illustrated by FIGS. 1 to 7, can also be implemented in a more complex distribution system comprising more devices, either to the production or distribution side or at the consumption side.

DETAILED DESCRIPTION OF THE EMBODIMENTS

The present disclosure relates to the technical field of devices adapted to process audio and/or video signals, notably in view of their distribution and/or consumption.

Term "process" is herein to be understood in its larger scope and encompass one or more diverse operation like acquiring, product, storing, encoding, transmitting, receiving, decoding, rendering at least a part of an audio and/or video content, and/or the control at least partial of such operation. The rendering of an audio and/or video content can differ depending on the nature of the audio and/or video content and can comprise for instant displaying a video part of the content or playing an audio part of the content. The processing of a content can involve a modification of a format of the content.

According to the present disclosure, when the processing includes a format modification, side information representative of the performed format modification can be associated with the content and kept (e.g. store and/or transmit) with the content and/or in link with the content. This side information can include information representative of the original format, information representative of the obtained format, and/or also information representative of at least one method used for performing the format modification. This is notably the case (at a transmitter side for instance), when a content that has been acquired or generated in a first format is modified to be represented in a second format of higher or lower quality. For instance, the side information can permit at a later stage (for instance at a receiver side) to determine a type of format modification that has already been performed on the content and thus, to select a processing (notably a format modification method) accordingly. For instance, when a content is received with a format having a lower quality than the original format of the content (at the time of its acquisition or generation), while it is necessary to convert the content to a format of higher quality again, the method to be used for the format modification of the content can be chosen in order to be consistent with the former format modification already performed, so as to obtain a content with colors and/or luminances being the most similar to the original colors and/or luminances of the content for instance.

The formats of a content can be diverse, depending on the kind of represented data.

Furthermore, a format can be a format compatible with at least one standard format (which will be more adapted to exchanges of content between heterogeneous devices) or can be a specific format (like a "proprietary" format), for instance a format providing some advantage in term of storage or processing cost.

Formats can correspond to representations involving a varying coding cost and thus varying requirements in terms of bandwidth for the transmission of a content. For instance, an audio content represented by using a first format can have a lower coding cost (and thus require a lower bandwidth) than the same audio content represented by using a second format.

Color formats can be based on luminance (like color format corresponding to a 1D range) and/or colorimetry (like color format corresponding to color gamuts in 2 or 3D for instance) for instance. Examples of well-known video standards based on luminance include the International Telecommunication Union-Radiocommunication Sector (ITU-R) BT.2100 standard (Broadcasting service (television) Series—"Image parameter values for high dynamic range television for use in production and international programme exchange", July 2018), that represents notably video signals with a luminance up to 10000 $cd/m^2$, often called High Dynamic Range (HDR), and the Standard Dynamic Range (SDR) HDTV (High Definition TeleVision)

of the Society of Motion Picture and Television Engineers (SMPTE), that represents video signals at a luminance of 100 cd/m².

Some well-known video standards based on colorimetry include the colorimetry standard ITU-R BT.2020 (Broadcasting service (television) Series—"Parameter values for ultra-high definition television systems for production and international programme exchange"—October 2015) and the colorimetry standard ITU-R BT.709 (Broadcasting service (television) Series—"Parameter values for the HDTV standards for production and international programme exchange"—June 2015), the ITU-R BT.2020 colorimetry standard allowing to obtain a video signal having more saturated and colorful colors than a video signal according to ITU-R BT.709 colorimetry.

Various methods can be used for modifying a format of a content. For instance, the modifying of representations of colors of a video content can be based on a color transformation between two different color formats.

Format modifications can be classified, notably, according to their impact in terms of the range operation between ranges represented by their input and output formats. FIGS. 2A to 2D illustrate such range operations and are used below for helping to define some range operations between representation using an input format and belonging to an input range 200 and representation using an output format and belonging to an output range 210.

Figure 2A:
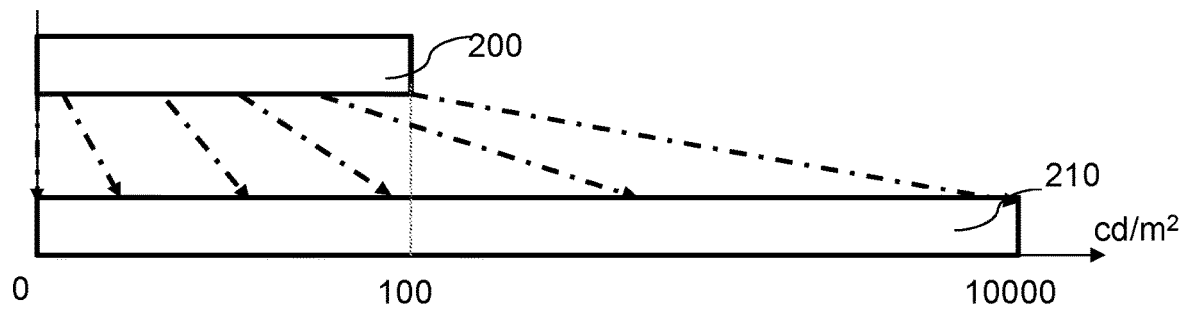
FIGS. 2A to 2D illustrates different kinds of range operations performed by a format modification.
Figure 2B:
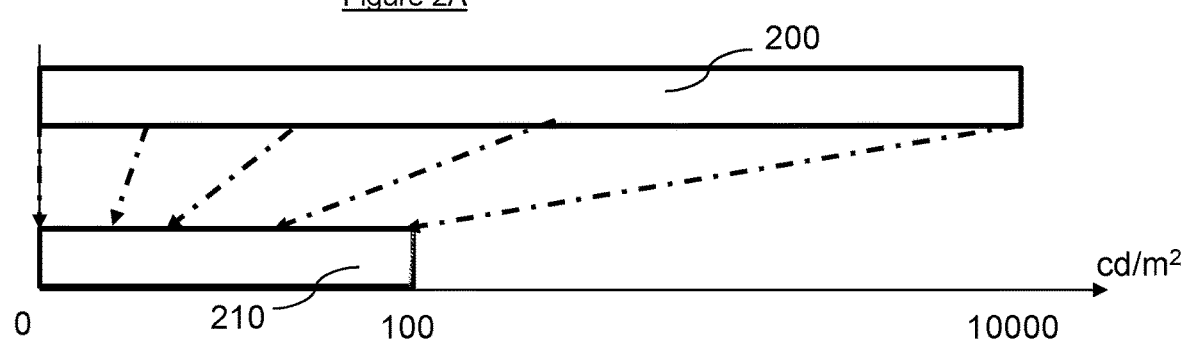

The present disclosure use terms "conversion of a content", or "converting a content" to designate an applying of a transformation to an input content having an input format, the applying of the transformation resulting in an output content having a output format, the output format corresponding to a different dynamic range (and thus leading to a different quality) than the input format and the transformation being reversible (or in other words invertible) (a given input value being always transformed to the same output value, irrespective of context, like for transformation being monotonically increasing or monotonically decreasing) and bijective (noninvasive), two different values using the input format being always converted into two different values using the output format, and resulting in a change of at least one representation of the content. Reversibility and bijectivity are understood up to quantization errors that may result from different bit depths of encoded values used in different standards. Quantization destroys parts of the information in a signal and cannot be recovered. In that sense, content conversion is reversible up to quantization errors that may be introduced by representing the signal in a signal format using quantized representation of signal values. FIGS. 2A and 2B illustrate examples of conversion.

As illustrated by FIG. 2A, when the output format of a content output by a conversion correspond to representation in an output range 210 being larger than the input range 200 represented by the input format of the content input to the conversion, the conversion is called an "up-conversion". Examples of up-conversion include, in the technical field of video processing, techniques known as "inverse tone mapping" (ITM), that transform lower luminances into higher luminances, thus improving the visibility of a content, and therefore its quality as assessed by a user viewing the content. Indeed, a SDR content, once up-converted (thus becoming an HDR content) can appear with higher luminances that the original SDR content. Luminance values are expanded to use more of the available HDR luminance range, and thereby leverage the display capabilities. Another example of up-conversion is color gamut expansion such as proposed by Lihao et al ("Color gamut mapping between small and large color gamuts: part II. gamut extension", LIHAO XU, BAIYUE ZHAO, M. R. LUO, Optics Express, Vol. 26, No. 13, Jun. 25, 2018).

As illustrated by FIG. 2B, when the output format of a content output by a conversion correspond to representation in an output range 210 being narrower than the input range 200 represented by the input format of the content input to the conversion, the conversion is called a "down-conversion". Examples of down-conversion include techniques known as "tone mapping" (TM), that transform higher luminances into lower luminances such that a HDR content, once down-converted (thus becoming a SDR content) appears with lower luminances than the original HDR content. HDR range of luminance values is compressed to fit into the available SDR luminance range, and thereby a HDR content, once down-converted, can be shown on legacy SDR displays. Another example of down-conversion is color gamut compression. As a non-limitative example, at least some of the techniques described in Annex 1 or Annex 5 of standard BT.2407 (Report ITU-R BT.2407-0, "Colour gamut conversion from Recommendation ITU-R BT.2020 to Recommendation ITU-R BT.709", October 2017) can be used for down-conversion.

Some other types of transformation can be either non-bijective or not reversible or can only modify representation of only a part of the input range. Examples of such transformations include in the technical field of video processing, operations known as mapping and clipping, respectively illustrated by FIG. 2C and FIG. 2D.

Figure 2C:
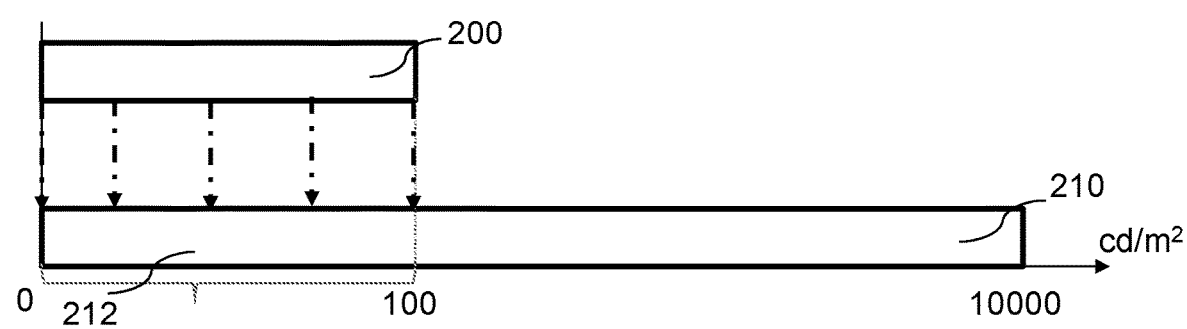

FIG. 2C illustrates a mapping (on in other terms a "direct mapping" or a "container container"). The output range 210 is larger than the input range 200. The values represented by the input range 200 are re-encoded (or mapped) as values represented in the output range 210. However, different from the range operation performed in up-converting, the potential of higher quality offered by the larger output range is not exploited as only a sub-range 212 having the same size as the input range is used in the output range.

For example, an SDR video signal can be mapped to an HDR video signal. Such a mapping can permit to represent colors of the video content originally conveyed by the SDR signal in another format having a larger bit depth, like a wider color gamut or a higher dynamic range. During the mapping, colors coded by using the first video standard are re-encoded as colors according to the other format. If shown on an HDR display, the mapped content will appear with the same hue, with the same saturation and at the same luminance as the original SDR content. In this case, SDR content is simply placed into an HDR container without changing the dynamic range (Using the ITU-R vocabulary). For instance, the color gamut specified by ITU-R BT.2020 standard is much larger than the color gamut specified by ITU-R BT.709 standard. A '709' image can be mapped into a '2020' color space where it will only use a (small) portion of the available color gamut. The resulting image is often referred to as a 'BT 709 image in a BT 2020 container'.

This means that—for example—values of RGB coding can be changed by the mapping but the actual colors (or in other words the signification of original and changed RGB values) are the same. In simpler words, even if the encoding is changed, the hue, the saturation and the luminance of a corresponding pixel of a video content, as seen by a user, is kept unchanged (or almost unchanged) by the mapping. This use of mapping can lead to preserve the "look" of the SDR content when shown on an HDR display. Using the ITU-R vocabulary, mapping can be seen mainly as a change of container (whereas an up-conversion is a modification of content further to a change of container.) As the range of colors in the resulting content is not larger, the quality of the output content is not improved in a consumer's perspective. The mapping of SDR to HDR can be implemented differently depending embodiments. For instance, as a nonlimitative example, mapping can be based on the technique described in BT.2087 standard documentation (Recommendation ITU-R BT.2087-0, "Colour conversion from Recommendation ITU-R BT.709 to Recommendation ITU-R BT.2020", October 2015) or as discussed in ITU-R BT.2408-0, ("Operational practices in HDR television production", April 2018). Notably, display-referred mapping can be used. One advantage of such a technique can be helping to preserve the colors and relative tones seen on an SDR BT.709 or BT.2020 display, when the content is shown on a BT.2100 HDR display, possibly at a slightly higher peak luminance to provide a value for diffuse white and skin tones that is more consistent with the brightness of native HDR content. An example of which is the inclusion of SDR graded content within an HDR program. The mapping of SDR to HDR can also be implemented by using scene-referred mapping, where the source is a direct SDR camera output. Such a technique can thus help to match the colors and lowlights and mid-tones of a BT.2100 HDR camera. An example of which is the inter-mixing of SDR and HDR cameras within a live television production.

Figure 2D:
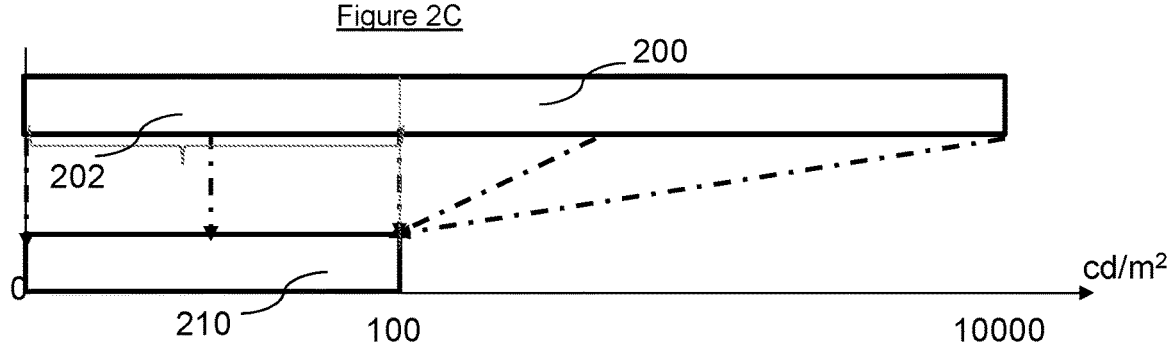

FIG. 2D illustrates a clipping. The output range 210 is narrower than the input range 200. The values represented by the input range 200 are transformed in values represented in the output range 210. At the difference of down-converting, values of the input range being outside a sub-range 202 having the same size as the output range 210 are all transformed in an extrema value of the output range. More precisely, clipping can be performed by defining one or more threshold values, in the input range, those threshold values corresponding for instance, in case of colors, to tints of the extrema of the output range, and assigning to the values of the input range being outside the threshold the threshold values. The clipping can be followed (or preceded) by a re-encoding of the values of sub-range of the input range limited by the threshold values, by using the representation of the output format.

Obviously, many distinct representations of the input range are given the same representation in the output range, thus decreasing the quality of the representation of the content. As a non-limitative example, colors from a HDR video can be clipped to a maximum given luminance in order to become a SDR video. If a color of the HDR video is represented in an RGB space as a 3D point, expressed in a linear floating-point format by values R, G, B belonging to the range [0; max], with for example max=200, all respective R, G, B values being larger than 1 can be set (or in other words clipped) to a "clipped" respective value R', G', B' belonging to the range [0; 1].

Usually, in a linear HDR content, RGB values being less than 1 correspondent to surfaces in the scene with so-called diffuse reflection and constitute a large portion of the image. Pixels with R, G, B values being greater than 1 correspondent to specularities on glossy or metallic surfaces or to visible light sources and cover usually very small portions of the image. According to a first example, a camera capturing a high contrast scene with very bright and very dark portions, can clip too bright parts of the scene to its maximum output level. According to a second example, based on luminances, colors of a HDR content that are outside the SDR color gamut can be clipped in order to transform the colors of the content into a SDR format. According to a third example, colors of a wide color gamut content that are outside of the color gamut of a narrow color gamut format can be clipped in order to transform the colors of the wide color gamut content into a content of narrow color gamut.

As a non-limitative example, for clipping, the technique described in Section 2 or Annex 2 of BT.2407 (Report ITU-R BT.2407-0, "Colour gamut conversion from Recommendation ITU-R BT.2020 to Recommendation ITU-R BT.709", October 2017) can be used. This technique re-encodes first all colors from BT.2020 to BT.709. Then, colors with invalid R, G, B coordinates are clipped. These colors are outside of the BT.709 color gamut and have R, G, B coordinates—after re-encoding into BT.709—that are either negative or larger than allowed. These coordinates are clipped to zero or to the maximum value allowed, respectively.

Figure 8:
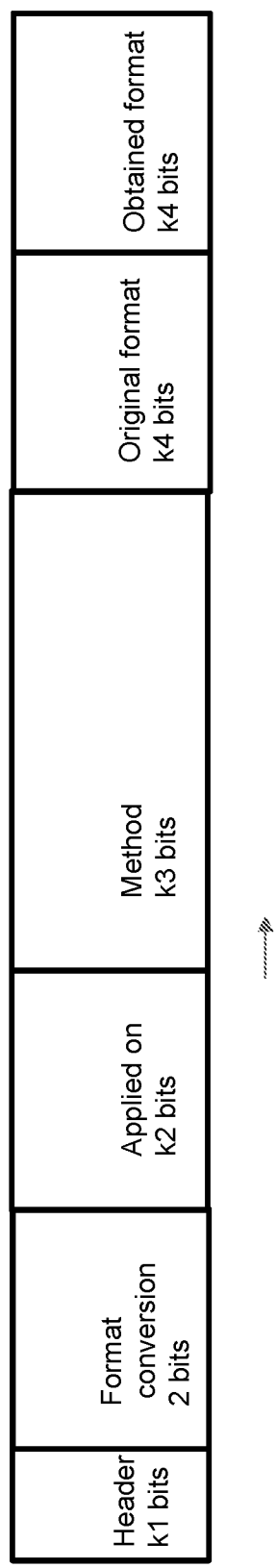
FIG. 8 illustrates an exemplary structure of side information in at least one embodiments of the present disclosure.

FIG. 8 presents an exemplary structure of side information that can be associated with a content, according to at least some embodiments of the present disclosure.

As illustrated, side information can comprise:
  indication signaling side information adapted to represent at least one format modification (this indication can be used as a header for instance);
  indication signaling a kind of format modification applied on the content. The indication can be an integer values coded on at least 2 bits. In the illustrated embodiment, the indication regarding the kind of format modification can permit to make a distinguish between an up-conversion, a down conversion, a direct mapping and a clipping for instance.
  Indication regarding the nature of elements on which the format modification has been applied (like an indication regarding Video Color gamut, Video Luminance Range and/or audio), method used for the format
  indication given details on at least one method used for the format modification
  indication regarding the format of the data input to the format modification method
  indication regarding the format of the data output by the format modification method Optionally, the side information can also comprise an indication regarding a number of format modification(s) applied to the content.

Examples of method and corresponding input/output formats are given below:
  in a first example, in case of an up-conversion applied on color gamut, the method can be a color gamut extension (conversion to a wider color gamut) or an Inverse Gamut Mapping, the method being performed between an original color space (like a color space according to ITU standard BT709) and an obtained color space (like a color space according to ITU standard BT2020).
  in a second example, in case of an up-conversion applied on Video Luminance range, the method can be an inverse tone mapping (conversion to a higher dynamic range) the method being performed between an original luminance range (like 0-100 nits) and an obtained luminance range (like.0-1000 nits)
  in a third example, in case of a down-conversion applied on color gamut, the method can be a color gamut compression (conversion to a narrower color gamut) or Forward Gamut Mapping, the method being performed between an original color space (like a color space according to ITU standard BT2020) and an obtained color space (like a color space according to ITU standard BT709).

in a fourth example, in case of a down-conversion applied on Video Luminance range, the method can be an inverse tone mapping (conversion to a higher dynamic range) the method being performed between an original luminance range (like 0-1000 nits) and an obtained luminance range (like 0-100 nits)

in a fifth example, in case of a mapping applied on color gamut, the method can be a mapping to a wider color gamut) or an Inverse Gamut Mapping, the method being performed between an original color space (like a color space according to ITU standard BT709) and an obtained color space (like a color space according to ITU standard BT2020).

in a sixth example, in case of a mapping applied on Video Luminance range, the method can be an inverse tone mapping (conversion to a higher dynamic range) the method being performed between an original luminance range (like 0-100 nits) and an obtained luminance range (like.0-1000 nits)

in a seventh example, in case of a clipping applied on color gamut, the method can be a color gamut compression (conversion to a narrower color gamut) or Forward Gamut Mapping, the method being performed between an original color space (like a color space according to ITU standard BT2020) and an obtained color space (like a color space according to ITU standard BT709).

in a eighth example, in case of a clipping applied on Video Luminance range, the method can be an inverse tone mapping (conversion to a higher dynamic range) the method being performed between an original luminance range (like 0-1000 nits) and an obtained luminance range (like 0-100 nits.)

In the above examples, the method can for instance be a method proposed by a communication standard like the ITU standard.

In case of audio, examples the method include methods like Sample Rate Converter, dynamic compressor and/or level Expander, the input/output format being for instance at least one audio frequency, audio dynamic, and/or audio level.

According to at least some embodiments, embodiments, the signaling can be performed using at least one syntax element being at least one of a Picture Parameter Set (PPS), a Sequence Parameter Set (SPS), a Supplemental Enhancement Information (SEI) message, a Video Usability Information (VUI) (like information defined for example in video compression standards such as AVC or HEVC), Consumer Electronics Association (CEA) message, and a header.

FIG. 1 illustrates a distribution system 100 adapted to implement at least one embodiment of the present disclosure. In the illustrated embodiment, the distribution system 100 comprises communication devices 110, 112, 114, 120, 130, 160, 170, 180 that can exchange data inside one or more communication networks. For instance, some communication devices 110, 112, 114, 120, 130 can exchange data via a local area network (LAN) 140 associated with a content provider processing environment. Some communication devices 160, 170, 180 can exchange data via a LAN 190 associated with a content consumption processing environment, Exchanges inside a LAN can be performed thanks to wired communication interfaces (like Ethernet interface or interface based on Power Line communication (PLC) technology) and/or wireless communication interfaces, like WIFI® interfaces. Some communication devices 130, 160 of the LAN 140 190 can exchange data via a Wide Area Network 150 (like a Broadcast Network or a broadband Network).

The content provider processing environment can comprise one or several audio and/or video acquiring device(s) 110 (like cameras and/or microphones), and/or one or several content production device(s) 114 for generating audio and/or video content (notably content representing virtual reality scenes or augmented reality scenes), and/or one or several storing device(s) 112, and/or one or several encoding device(s) 120, and/or one or several transmitting device(s) 130. Some of those devices can be optional in some embodiments.

The content consumption processing environment can comprise one or several receiving devices 160, one or more decoding device(s) 170 and one or more rendering devices (like display or speakers) 180. Some of those devices can be optional in some embodiments.

At least one or more (optionally all) of those devices can require some specific input formats regarding its input content and/or can output a content having a specific output format (like an output format selectable between several given output formats).

Figure 4:
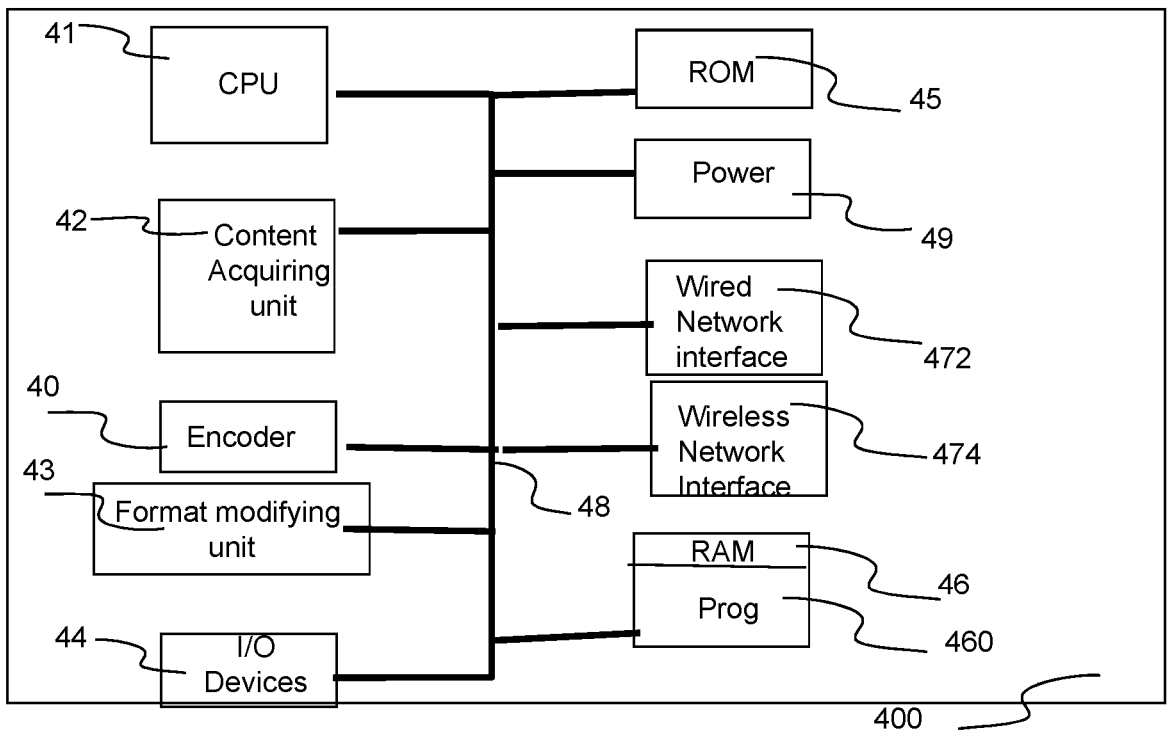
FIG. 4 illustrates an exemplary functional structure of an electronic device adapted to correspond to at least some of the devices of FIG. 1.

FIG. 4 describes an exemplary functional structure of a content processing device 400 comprising format modification capabilities. The processing device of FIG. 4 can be implemented in the content provider processing environment 140 of FIG. 1, for instance in the encoding device 120 of FIG. 1. The content processing device 400 is notably adapted to implement the method 600 of the present disclosure, that is described later. It is to be pointed out that the elements, or module, or blocks, of the functional structure illustrated of FIG. 4 can be implemented thanks to software components of the content processing device 400 and/or thanks to hardware components of the content processing device 400. At least some elements illustrated by FIG. 4 can comprise both at least one software component and at least one hardware component of the input device.

In the exemplary embodiment of FIG. 4, the content processing device 400 can include different devices (or modules), linked together via a communication bus 48, such as a control, data and address bus, which can also carry a timer signal. For instance, it can include one or several micro-processors 41 (or Central Processing Units (CPU)), a ROM (or «Read Only Memory») 45, a RAM (or «Random Access Memory») 46 and wired and/or wireless communication interface(s) 472, 474. Notably, at least one of communication interfaces 472, 474 of the content processing device 400 can be adapted to receive one or more audio and/or video content or stream.

In the illustrated embodiment, the content processing device 400 can also comprise at least one communication interface 472, 474 providing access to the Network 150.

In the exemplary embodiment of FIG. 4, the content processing device 400 can also comprise at least one format modifying unit 43 adapted to modify the format of an input content and an encoding unit 40 adapted to re-encode the content (either instead, before or after of its processing by the format modifying unit).

In the exemplary embodiment of FIG. 4, the content processing device 400 can further comprise at least one Input/Output module 44, (like a tactile display, a switch, a led, a button, and so on). Notably, the content processing device can comprise an input Interface adapted to enable a user to request a specific kind of format modification and/or to enter some parameters adapted to tailor the format modification to be performed by the format modifying unit 43. In some embodiments, those parameters can notably be obtained at the time of the format modification.

Each of the mentioned memories can include at least one register, that is to say a memory zone of low capacity (a few binary data) or high capacity (with a capability of storage of a whole program or of all or part of data representative of data to be calculated or displayed).

When the content processing device 400 is powered on, via a power supply module 49, for instance a power supply module connected to the power line network, the at least one microprocessor 41 loads the program instructions 460 in a register of the RAM 46, notably the processes needed for performing at least one embodiment of the method 600 described hereinafter and executes the program instructions.

The content processing device 400 of the system can be adapted to implement the method 600 of the present disclosure, in any of its embodiments.

For instance, in the exemplary embodiment illustrated in FIG. 4, the microprocessor 41 can be configured for:
- obtaining an audio and/or video input content complying with a first format, the first format providing a representation of data in a first range of values;
- applying a first format modification to the input content, the first format modification being adapted to provide an output content complying with a second format, the second format providing a representation of data in a second range of values;
- associating to the output content side information comprising a designation of a first kind of format modification among several kinds of format modifications, the first kind of format modification being representative of range operations performed between values of the first and second ranges by the first format modification.

For instance, in the exemplary embodiment illustrated in FIG. 4, the microprocessor 41 can also be configured for:
- obtaining an audio and/or video input content complying with a first format, the first format providing a representation of data in a first range of values;
- applying a first format modification to the input content, the first format modification being adapted to provide an output content complying with a second format, the second format providing a representation of data in a second range of values;
- associating with the output content side information comprising a designation of the first format modification, wherein the first format modification includes at least an up-conversion, a down-conversion, a mapping, a clipping or a combination thereof, the first format modification being representative of range operations performed between values of the first and second ranges by the first format modification.

The structure depicted in link with FIG. 4 has only an exemplary purpose. It is to be pointed out that the content processing device 400 can further comprise additional capabilities illustrated as provided by separate devices (like devices 110, 112, 114, 130, 150, 160, 170 and/or 180) in FIG. 1. Furthermore, at least some embodiments of the present disclosure can be at least partially implemented in at least one content processing device externally coupled to another device.

Figure 5:
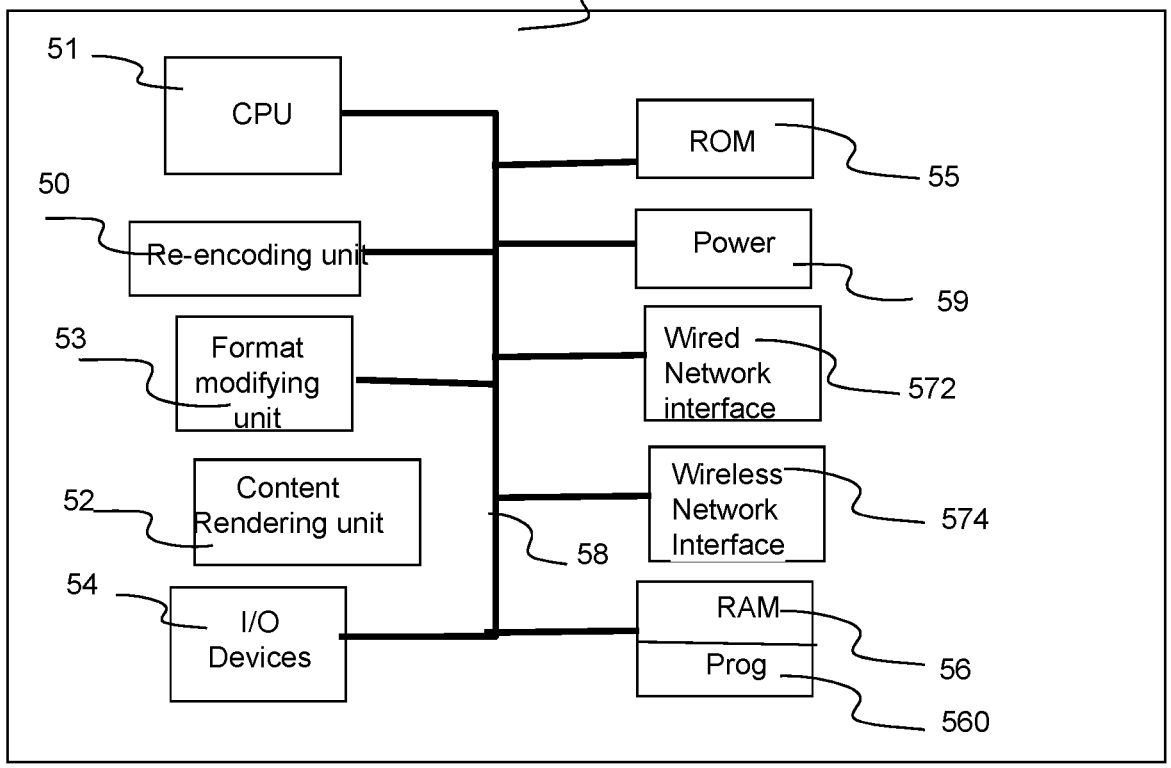
FIG. 5 illustrates an exemplary functional structure of another electronic device adapted to correspond to at least some of the devices of FIG. 1.

FIG. 5 describes an exemplary functional structure of another content processing device 500 comprising format modification capabilities. The processing device of FIG. 5 can be implemented in the content consumption processing environment 190 of FIG. 1 (for instance in the decoding device 170 of FIG. 1), or (as in will be explained later in link with the exemplary use case of roundtripping) in the content provider processing environment 140 of FIG. 1, for instance in the encoding device 120 of FIG. 1 or in another encoding device (not illustrated by simplification purpose) of the content provider processing environment 140 of FIG. 1, or in another content provider processing environment (not illustrated by simplification purpose) than the content provider processing environment 140 of FIG. 1. The content processing device 500 is notably adapted to implement the method 700 of the present disclosure, that is described later. It is to be pointed out that the elements, or module, or blocks, of the functional structure illustrated of FIG. 5 can be implemented thanks to software components of the content processing device 500 and/or thanks to hardware components of the content processing device 500. At least some elements illustrated by FIG. 5 can comprise both at least one software component and at least one hardware component of the input device.

In the exemplary embodiment of FIG. 5, the content processing device 500 can include different devices (or modules), linked together via a communication bus 58, such as a control, data and address bus, which can also carry a timer signal. For instance, it can include one or several micro-processors 51 (or Central Processing Units (CPU)), a ROM (or «Read Only Memory») 55, a RAM (or «Random Access Memory») 56 and wired and/or wireless communication interface(s) 572, 574. Notably, at least one of communication interfaces 572, 574 of the content processing device 500 can be adapted to receive one or more audio and/or video content or stream.

In the illustrated embodiment, the content processing device 500 can also comprise at least one communication interface 572, 574 providing access to the Network 150.

In the exemplary embodiment of FIG. 5, the content processing device 500 can also comprise at least one format modifying unit 53 adapted to modify the format of an input content and a re-encoding unit 50 adapted to re-encode the content (either instead, before or after of its processing by the format modifying unit).

In the exemplary embodiment of FIG. 5, the content processing device 500 can further comprise at least one Input/Output module (or I/O Module) 54, (like a tactile display, a switch, a led, a button, and so on). Notably, the content processing device can comprise an input Interface adapted to enable a user to request a specific kind of format modification and/or to enter some parameters adapted to tailor the format modification to be performed by the format modifying unit 53. In some embodiments, those parameters can notably be obtained at the time of the format modification. This interface is optional, indeed the tailoring of the format modifying performed by the content processing device can be automated. Notably, the selection of the kind of format modification to be performed by the content processing device can be determined without any user input at the time of the format modification. In the illustrated embodiment, the content processing device can comprise a content rendering unit 52, adapted to render the content in one or more format. The rendering unit can include a display and/or a speaker. This content rendering unit is optional in some embodiments.

Each of the mentioned memories can include at least one register, that is to say a memory zone of low capacity (a few binary data) or high capacity (with a capability of storage of a whole program or of all or part of data representative of data to be calculated or displayed).

When the content processing device 500 is powered on, via a power supply module 59, for instance a power supply module connected to the power line network, the at least one microprocessor 51 loads the program instructions 560 in a register of the RAM 56, notably the processes needed for performing at least one embodiment of the method 600 described hereinafter and executes the program instructions.

The content processing device 500 of the system can be adapted to implement the method 700 of the present disclosure, in any of its embodiments.

In the exemplary embodiment illustrated in FIG. 5, the microprocessor 51 can be configured for:

- obtaining an audio and/or video input content, the audio and/or video input content complying with an input format, the input format providing a representation of data in an input range of values,
- obtaining side information associated with the input content and comprising a designation of at least one first kind of format modification among several kinds of format modifications, the first kind of format modification being adapted to represent range operations performed between values of a first range and values of a second range by a first format modification;
- determining whether to apply a second format modification to the input content by taking account of the first kind of format modification of the associated side information and, when a second format modification is needed on the input content, determining a kind of the second format modification by taking account of the first kind of format modification of the associated side information.

For instance, in the exemplary embodiment illustrated in FIG. 5, the microprocessor 51 can also be configured for: obtaining an audio and/or video input content, the audio and/or video input content complying with an input format, the input format providing a representation of data in an input range of values,

- obtaining side information associated with the input content and comprising a designation of at least one first format modification, the first format modification including at least an up-conversion, a down-conversion, a mapping, a clipping or a combination thereof, the side information being adapted to represent range operations performed between values of a first range and values of a second range by the first format modification;
- determining a second format modification to apply to the input content by taking account of the first format modification of the associated side information.

The structure depicted in link with FIG. 5 has only an exemplary purpose. It is to be pointed out that the content processing device 500 can further comprise additional capabilities illustrated as provided by separate devices (like devices 110, 112, 114, 130, 150, 160, 170 and/or 180) in FIG. 1. Furthermore, at least some embodiments of the present disclosure can be at least partially implemented in at least one content processing device externally coupled to another device.

When several devices are successively in charge of processing an audio and/or video content, like in the case of a distribution of an audio and/or video content from a content provider to a consumption environment (as illustrated by FIG. 1), the formats of the content can fluctuate. This can lead to artifact when a format modification is applied without taking account, or without having knowledge, of a kind of format modification previously applied to the content.

For instance, a content, acquired in a HDR format, can be transmit under a Low Dynamic Range (LDR) or SDR format such as to be displayed directly on a legacy LDR display or to be displayed on a HDR display after being formatted as an HDR format. The overall processing can also make use of more than two formats. However, applying successive format modifications to a content may lead to strong artifact. For instance, the appliance of a down-conversion (illustrated by FIG. 2B) to a content resulting from a previous mapping (illustrated by FIG. 2C) of an input content may lead an output content to a very narrow range of values inside the output content and thus to an output content of poor quality from a user's perspective.

Indeed, the format modification that should be apply to a content should be chosen not only according to the current format of the content and to desired resulting format but also according to the format modifications that have already been brought to the content. Thus, there is a need to provide, in association with a content, information at least partially representative of the history of format modification of the content. For instance, in the above use case, it can be very useful, at the time of selecting the format modification to be applied to a LDR content generated from a HDR content to know whether the LDR content has been generated by clipping or by a down-conversion. In case of a previous down-conversion, an up-conversion will be better adapted than a mapping. At the opposite, in case of clipping, a mapping would be better adapted than an up-conversion.

Another issue with format can be faced in case of round-tripping. Round-tripping designates situation where a content is multiply converted in between two formats of different quality. Round-trip can happen for instance during production of some television "assembled" contents, where parts of a first content are inserted in another content and have therefore to be formatted. Such insertions can be done several times during the production workflow, resulting in round-tripping for those parts of content that can be multiply converted and/or multiple clipped and mapped. However, as successive format modifications can be done in different places or different times, the knowledge of the kind of format modifications already performed on a content can be lost during a later stage of roundtripping. For instance, a first down-conversion or clipping can be performed on a content in a first content producing processing environment in order to fit into a content format with lower quality, a further format modification may be necessary in a second content producing processing environment in order to fit the content into a format with higher quality. A first potential situation where a clipped content from the first environment is up-converted in the second environment or a second potential situation where a mapped content from the first environment is down-converted in the second environment would both lead to inacceptable degradation of the content.

At least some embodiments of the present disclosure propose, to help to avoid such degradation of content quality, to select the format modification to be applied at a later stage by taking into account of the kind of format modification already performed. For instance, in at least some embodiments, care has to be taken that a down-conversion is—at least to a certain extent—inverse to an up-conversion that has been performed on a content such that the successive conversions do not degrade the content or at least to not degrade too much the content.

Also, in at least some embodiments, clipping can be preferred to down-conversion for modifying the format of a content for a lower quality format, while mapping can be preferred to up-conversion for modifying the format of a content for a better-quality format. Indeed, it is to be pointed out that, once a first clipping has been applied to a content, more round-tripping using mapping and clipping will not degrade more the content. Thus, the quality of the content can be kept among successive roundtripping.

FIG. 6 shows an exemplary embodiment of the method 600 of the present disclosure, implemented for instance in the device 400 of FIG. 4. In the illustrated embodiment, the method comprises obtaining 610 an audio and/or video input content complying with a first format, the first format providing a representation of data in a first range of possible values. The first format can be for instance a color format (like colorimetry or luminance) or an audio format. Depending upon embodiments, the audio and/or video content can be stored in a memory of the electronic device where the method is implemented, or can be received from a communication interface of the device.

The method can further comprise modifying 620 the format of the content, by applying a format modification to the obtained content. The format modification results in a content having a second format. The format modification can be chosen according to the first format of the obtained content and also in view of a further processing of the content. For instance, a second format can be required by a forthcoming processing, and thus the format modification should output data in the second format. In the exemplary embodiment of FIG. 6, the method can comprise associating 630 indication regarding the format modification that has been performed on the content. Notably, the indication can include a designation of a kind of the format modification. The kind of the format modification can be representative of range operations performed between range of values representable by the input and output format of the format modification.

Depending upon embodiments, the indication can be associated as side information to the content (for instance it can be mixed with the content, as signaling information), or can be part of metadata related to the content, or can be stored in an auxiliary file linked to the content. In the detailed embodiment of FIG. 6, the method can comprise outputting 640 the content, with the associated side information. For instance, the content and its associated side information can be output to another device via a communication interface, notably to a transmitting device for being transmitted to a content consumer processing environment as illustrated by FIG. 1, or to a storage device for a later processing, for instance for a forthcoming assembling with another content by a producing device (like in round trip situation). It is to be pointed out that even if not described herein the method can comprise, prior the outputting 640 of the content, an encoding of the content.

Embodiments of a method implemented in a content processing device, adapted to apply a first format modification operation to a content, like the device 400 of FIG. 4, has been described above. Embodiments of a corresponding method 700 implemented notably in a same or in another content processing device are described below in link with FIG. 7.

FIG. 7 shows an exemplary embodiment of the method 700 of the present disclosure, implemented in a content processing device, like the decoding device 500 of FIG. 5.

According to FIG. 7, the method 700 comprises obtaining 710 an audio and/or video input content. The format of the input content, referred to hereinafter as an "input" format, is a format providing a representation of data in a range of possible values, referred to hereinafter as an "input" range. The input format can be for instance a color format (like colorimetry or luminance) when the content is a video content or an audiovisual content, or an audio format when the content is an audio content or an audiovisual content. Depending upon embodiments, the audio and/or video content can be stored in a memory of the electronic device where the method 700 is implemented, or can be received from a communication interface of the device. Notably, in reference to FIG. 1, it can be received from the network 150 via the receiving device 160.

In the illustrated embodiment of FIG. 7, the method can comprise obtaining 720 side information associated with the audio and/or video input content, the side information being related to an history of at least one format modification applied to the content. In the illustrated embodiment, the side information, is received together with the input content. Depending upon embodiments, the side information can be mixed with the content, as signaling information for instance, or in the form of metadata or can be kept in an auxiliary file for instance. According to the present disclosure the side information can comprise an indication regarding a kind of at least one first format modification previously applied on the input content. The indication can be representative of range operations performed between range of values representable by the input and output format of the at least one first format modification. In some embodiments, this indication can be for instance representative of an element of a group enumerating elements corresponding respectively to up-conversions, down-conversions, mapping, clipping. In other embodiments, this indication can be for instance representative of an element of a first group enumerating elements corresponding respectively to: up-conversions and mapping, or representative of an element of a second group enumerating elements corresponding respectively to: down-conversions and clipping.

It is to be pointing out that, depending upon embodiments, the indication can be related to one or several format modifications applied to the content. In some embodiments, only some information relative to the last format modification applied to a content (like a kind of the last format modification) can be present in the side information. In other embodiments, the side information can comprise an history relating to several format modifications applied to the content, the history comprising information relative to several previously applied format modifications (for instance information relative to the n-last format modifications applied to a content, including notably the kinds of the n-last format modifications applied to a content (with n integer strictly greater to 1).

According to FIG. 7, the method can further comprise determining 730 a second format modification to be applied to the obtained content. For instance, a given format can be required by a forthcoming processing, like a rendering of the content by a specific display or speaker, or an insertion of the content in another content having a different format. According to the present disclosure, the determining 730 of the second format modification can notably take into account (further to the input format and the format required to be output by the second format modification) the kind of the first format modification previously applied to the content. The kind of the second format modification (to be applied next to the content) can notably be selected among possible kind of format modifications leading to the required output format, so as to help avoiding artefacts in the output content.

Depending upon embodiments, and depending on the obtained side information, the second format modification can be selected according to different rules. Notably, some rules can only take into account side information regarding the latest format modification already applied to the content, while some other rules can take into account side information relating to several format modifications already applied to the content (like all side information relating to format modifications already applied to the content or side information relating to the n-latest format modifications already applied to the content); A rule can also takes into account the presence of a given kind of format modification in the side information (like the presence of at least one non-reversible format modification as a mapping or a clipping in the history). For instance, a rule can take into account a presence of a flag signaling an occurrence of a non-reversible format modification on the content.

The method 700 can further comprise applying 740 the determined second format modification.

In the detailed embodiment of FIG. 7, the method can further comprise updating 750 the side information associated with the content, in order to incorporate in the side information some information relating to the second format modification applied, like an indication regarding the kind of the second format modification that has been applied to the content. Such an updating can permit at a later stage to help selecting another (third) format modification to be applied to the content. The content can be output 760 to another device via a communication interface, notably to a transmitting device for being transmitted to a content consumer processing environment as illustrated by FIG. 1, or to a storage device for a later processing, for instance for a forthcoming assembling with another content by a producing device (like in round trip situation).

It is to be pointed out that, as illustrated below in link with FIG. 3B, for a same input and output format, the applying or not of a second format modification can depend on the first format modification (for instance, it can depend of the kind of the first format modification).

FIGS. 3A to 3D illustrate different uses cases of embodiments of the present disclosure, with fluctuations of the format of a content during its processing, for instance when the content is distributed for a content provider processing environment to a content consumption g environment via a network, as illustrated by FIG. 1, or when the content is provided from a first content provider processing environment to a second content providing environment via a network or via portable storage means for instance.

Figure 3A:
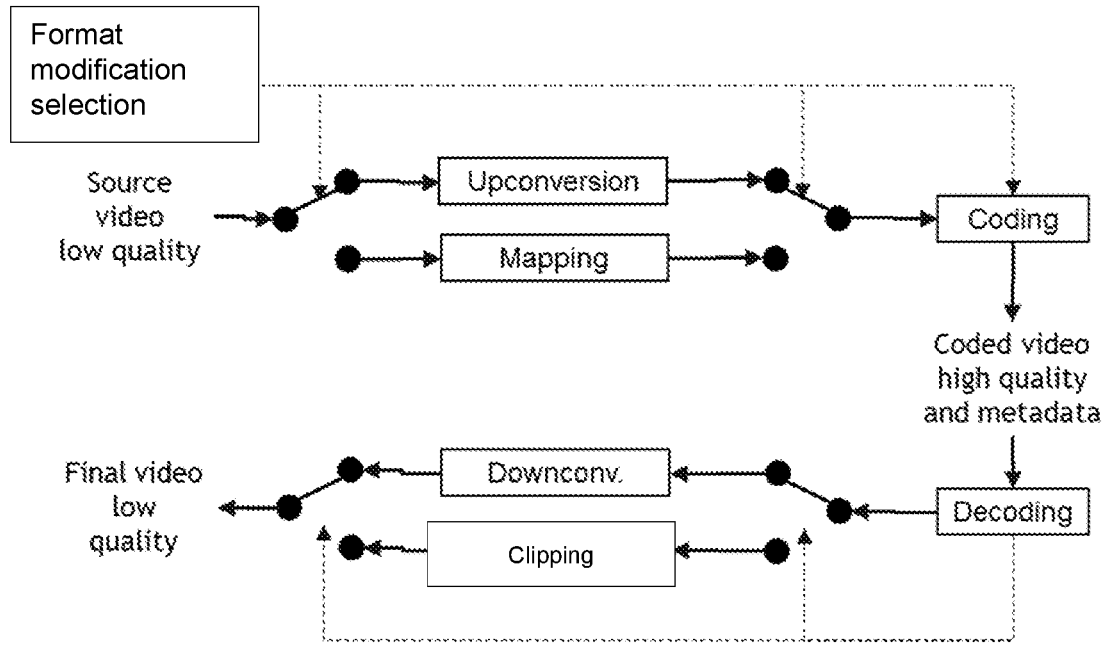
FIG. 3A to 3D illustrates exemplary fluctuations of the format used for a content during a processing workflow, compatible with the distribution system of FIG. 1.

In the exemplary use case of FIG. 3A, a video of low quality is obtained (in a BT.709 SDR format for instance) from a video source (like at least one of the storage device 112, acquiring device 110, and/or production device 114 of FIG. 1). As the video is to be processed by a first processing device (like transmitting device 140 of FIG. 1) requiring a high-quality format (for instance a HDR format of type known as Perceptual Quantization (PQ) type if referring to the BT.2100 standard) a first format modification needs to be applied to the video content in order to output a first video in an HDR format. As explained above, this first format modification can be an up-conversion or a mapping for instance. In the use case of FIG. 3A, the first format modification is an up-conversion. The indication of the side information associated with the content by performing the method 600 of FIG. 6, includes an indication of an up-conversion.

The first video content needs later to be processed again (for instance after being received by receiving device 160 of FIG. 1) but this time by a second processing device (for instance a SDR display) that requires an SDR video as input. Thus, a second format modification needs to be performed on the first video, in order to provide a SDR video as input of the second processing device. In the exemplary embodiment illustrated, the second processing device is adapted to perform a second format modification that can include a down-conversion or a clipping. In the use case of FIG. 3A, by performing the method 700 of FIG. 7, the obtained indication regarding the first format modification already applied corresponds to a kind of format modification being an up-conversion, thus the second format modification to be applied is determined as being a format modification including a down-conversion (ideally restituting the original source video) rather than a clipping.

Figure 3B:
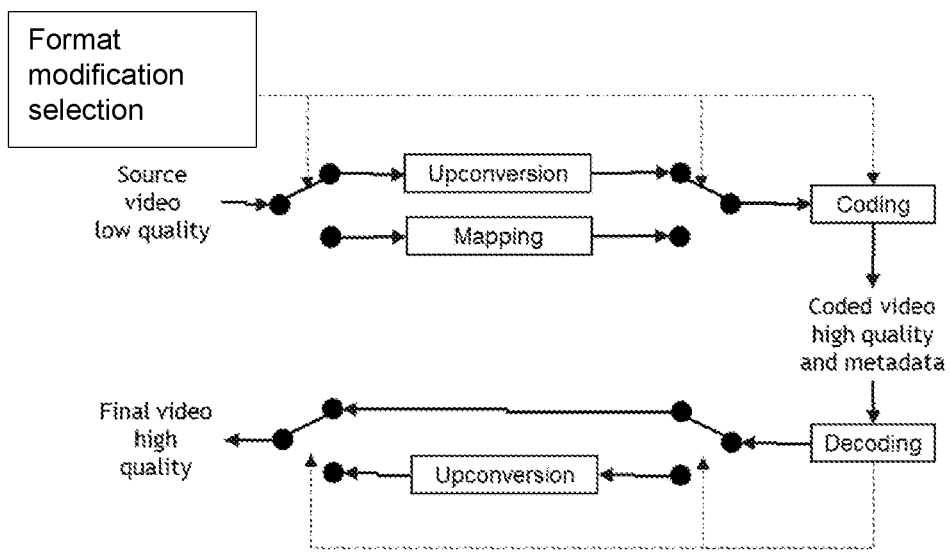

FIG. 3B illustrates a variant of the use case described in link with FIG. 3A, wherein as in FIG. 3A, the first format modification is an up-conversion of the SDR content in an HDR format, and wherein the second processing device requires a HDR content. As the first format modification is an "up-conversion", the HDR content output by the first modification already make use of the whole HDR range, no further format modification is performed before the processing by the second processing device.

Figure 3C:
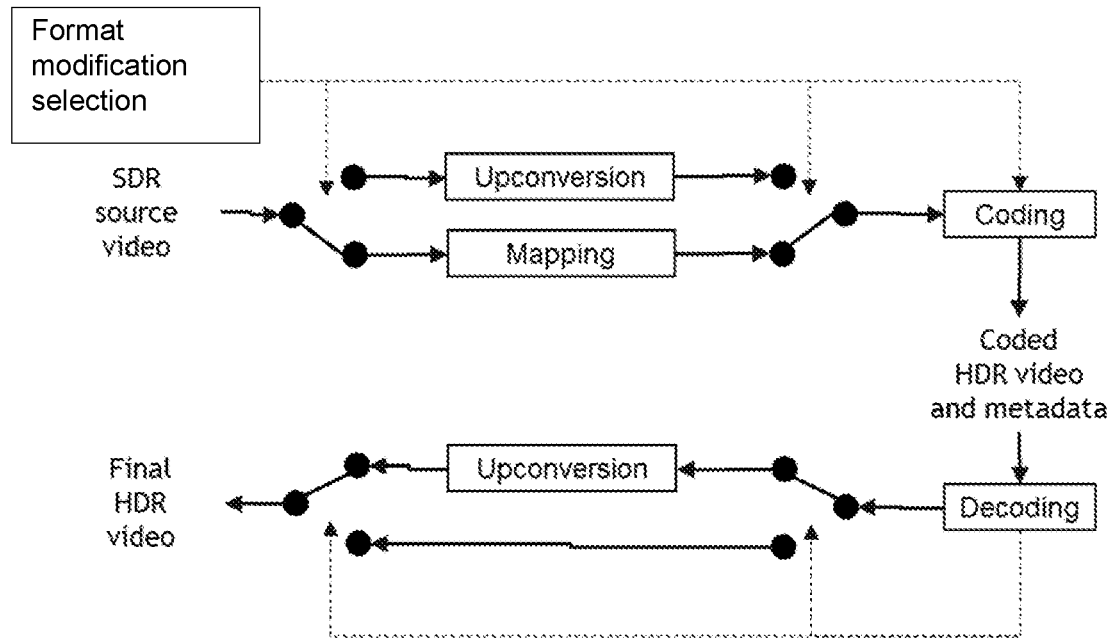

FIG. 3C illustrates another variant of the use case of FIG. 3A, where the first format modification is a mapping of the SDR content to an HDR format while the second processing device requires a HDR content. At the opposite of the use case illustrated by FIG. 3B, even if contained in a HDR range, the range of values of the HDR content provided by the first format modification is included in the sub-range representable by the SDR format. Thus, a second format modification being an up-conversion is applied to the HDR video, resulting in a final HDR video making better use of the whole range of HDR format, before the processing by the second processing device.

Such an embodiment of the present disclosure can thus help enhancing the quality of the content output to the processing device, and thus finally, in the exemplary embodiment of FIG. 1, help improving the user experience when the content is consumed by the user.

Figure 3D:
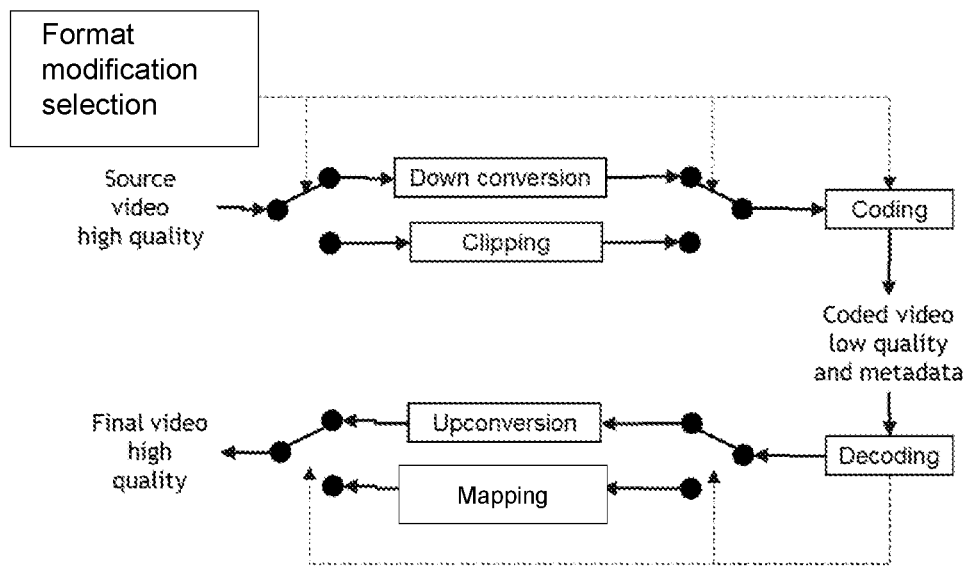

FIG. 3D illustrates another variant of the use case described in link with FIG. 3A, where the video obtained from the video source is a high-quality content (like a BT.2020 wide color gamut (WCG) source video), a first format modification (being either a down-conversion (like a Tone Mapped for instance) or a clipping) is applied to the video content in order to output a first video in an LDR or SDR format (like a video with standard color gamut according to BT.709). Such a format can permit the first video to be displayed directly on a LDR display. However, for the first video to be displayed on a HDR display, a second format modification is performed on the first video, in order to provide a HDR video, this second format modification can be either an up-conversion (like an Inverse Tone Mapping) or a mapping. In the use case of FIG. 3D, by performing the method 700 or FIG. 7, the obtained indication regarding the first format modification already applied corresponds to a kind of format modification being a down-conversion, thus the second format modification to be applied is determined as being an up-conversion, in order to obtain a video similar to the video source.

At the opposite, in some other use case (not illustrated) by performing the method 700 or FIG. 7, the obtained indication regarding the first format modification already applied can correspond to a kind of format modification being a clipping. The first video should not be up-converted (Inverse Tone Mapped) during the second format modification to avoid creating artefacts. Thus, the determining of the second format modification will lead, because of the obtained indication, to a second format modification being of mapping kind, the data of the first video being just re-encoded in a HDR format but with HDR values having a range of a same size as the SDR values of the first format.

As exposed above, the knowledge of the kind of format modification that has already been performed on a content, can help to improve, or at least avoid degrading too much, the quality of a content during a second format modification of the content. For instance, a lower range content being first formatted as a higher range content can then be reconstructed during a second format modification as a low range content without, or with few, degradation of its quality. For example, at least some embodiments of the present disclosure can help reconstructing a SDR signal without degradation from a signal SDR previously formatted as an HDR signal (or in other words an SDR signal placed in a HDR container). According to another example, at least some embodiments of the present disclosure can help to increase a quality of a content by using the side information associated with the content at the time of a second format modification, by taking account of the kind of format modification already applied to the content. Notably, as explained above, a HDR content using a more extended range of HDR values can be generated from an SDR content mapped in a HDR format (or in other words placed in a HDR container). Another example can be found regarding roundtripping, where the method 700 can permit, in at least some of its embodiments, in case of side information representative of a previous mapping, to do roundtripping between low and high-quality representations without loss of quality.

The present disclosure has been described in relation with protocols and/or standards. Of course, as it can be understandable by a person skilled in the art, the present disclosure can also be applied to a distribution or communication system using other communication protocols, notably communication protocols not related to wireless standard, or to other standard than WIFI standards, or other formats, adapted to an audio and/or video content than the ones cited in the present disclosure.

Also, the side information associated with a content and comprising at least one indication regarding at least one kind of format modification that has been applied to the content can further comprise other items of information and can be used in a processing device or system for other purpose than a determination of a further format modification to the content.

As can be appreciated by one skilled in the art, aspects of the present principles can be embodied as a system, device, method, signal or computer readable product or medium.

Notably, the present disclosure relates to a method, implemented in an electronic device, the method comprising:
  obtaining an audio and/or video input content complying with a first format, the first format providing a representation of data in a first range of possible values;
  applying a first format modification to the input content, the first format modification being adapted to provide an output content complying with a second format, the second format providing a representation of data in a second range of possible values;
  associating to the output content side information comprising a designation of a first kind of format modification among several kinds of format modifications, the first kind of format modification being representative of range operations performed between values of the first and second ranges by the first format modification.

According to at least one embodiment of the present disclosure, the several kinds of format modifications belongs to a group comprising elements representative of:
  an up-conversion;
  a down-conversion;
  a mapping;
  a clipping.

According to at least one embodiment of the present disclosure, the first range of values is greater than the second range of values.

According to at least one embodiment of the present disclosure, the first and second format are color formats.

According to another aspect, the present disclosure relates to an electronic device comprising at least one processor adapted for:
  obtaining an audio and/or video input content complying with a first format, the first format providing a representation of data in a first range of values;
  applying a first format modification to the input content, the first format modification being adapted to provide an output content complying with a second format, the second format providing a representation of data in a second range of values;
  associating to the output content side information comprising a designation of a first kind of format modification among several kinds of format modifications, the first kind of format modification being representative of range operations performed between values of the first and second ranges by the first format modification.

According to another aspect, the present disclosure relates to an electronic device comprising at least one processing circuitry, the at least one processing circuitry being adapted for:
  obtaining an audio and/or video input content complying with a first format, the first format providing a representation of data in a first range of values;
  applying a first format modification to the input content, the first format modification being adapted to provide an output content complying with a second format, the second format providing a representation of data in a second range of values;
  associating to the output content side information comprising a designation of a first kind of format modification among several kinds of format modifications, the first kind of format modification being representative of range operations performed between values of the first and second ranges by the first format modification.

While not explicitly described, the above electronic device of the present disclosure can be adapted to perform the above method of the present disclosure in any of its embodiments.

According to another aspect, the present disclosure relates to a method, implemented in an electronic device, the method comprising:
  obtaining an audio and/or video input content, the audio and/or video input content complying with an input format, the input format providing a representation of data in an input range of values,
  obtaining side information associated with the input content and comprising a designation of at least one first kind of format modification among several kinds of format modifications, the first kind of format modification being adapted to represent range operations performed between values of a first range and values of a second range by a first format modification;
  determining whether to apply a second format modification to the input content by taking account of the first kind of format modification of the associated side information and, when a second format modification is needed on the input content, determining a kind of the second format modification by taking account of the first kind of format modification of the associated side information.

According to at least one embodiment of the present disclosure, the method comprises updating the side information according to the applied second format transformation.

According to at least one embodiment of the present disclosure, the second range is the input range.

According to at least one embodiment of the present disclosure, the method comprises outputting the output content on a user interface.

According to another aspect, the present disclosure relates to an electronic device comprising at least one processor, the at least one processor being adapted for:
- obtaining an audio and/or video input content, the audio and/or video input content complying with an input format, the input format providing a representation of data in an input range of values,
- obtaining side information associated with the input content and comprising a designation of at least one first kind of format modification among several kinds of format modifications, the first kind of format modification being adapted to represent range operations performed between values of a first range and values of a second range by a first format modification;
- determining whether to apply a second format modification to the input content by taking account of the first kind of format modification of the associated side information and, when a second format modification is needed on the input content, determining a kind of the second format modification by taking account of the first kind of format modification of the associated side information.

According to at least one embodiment of the present disclosure, the at least one processor is adapted for outputting the output content on a user interface.

According to at least one embodiment of the present disclosure, the at least one processor is adapted for updating the side information according to the applied second format transformation.

According to another aspect, the present disclosure relates to an electronic device comprising at least one processing circuitry, the at least one processing circuitry being adapted for
- obtaining an audio and/or video input content, the audio and/or video input content complying with an input format, the input format providing a representation of data in an input range of values,
- obtaining side information associated with the input content and comprising a designation of at least one first kind of format modification among several kinds of format modifications, the first kind of format modification being adapted to represent range operations performed between values of a first range and values of a second range by a first format modification;
- determining whether to apply a second format modification to the input content by taking account of the first kind of format modification of the associated side information and, when a second format modification is needed on the input content, determining a kind of the second format modification by taking account of the first kind of format modification of the associated side information.

While not explicitly described, the above electronic device of the present disclosure can be adapted to perform the above method of the present disclosure in any of its embodiments.

According to another aspect, the present disclosure relates to a communication system comprising one or more electronic devices, a first electronic device of the one or more electronic devices comprising at least one processor adapted for:
- obtaining an audio and/or video input content complying with a first format, the first format providing a representation of data in a first range of values;
- applying a first format modification to the input content, the format modification being adapted to provide an output content complying with a second format, the second format providing a representation of data in a second range of values;
- associating, to the output content, side information comprising a designation of a first kind of format modification among several kinds of format modifications, the first kind of format modification being representative of range operations performed between values of the first and second ranges by the first format modification;
a second electronic device of the one or more electronic devices comprising at least one processor adapted for:
- obtaining the audio and/or video output content,
- obtaining the side information associated with the output content
- determining whether to apply a second format modification to the output content by taking account of the first kind of format modification of the associated side information and, when a second format modification is needed on the output content, determining a kind of the second format modification by taking account of the first kind of format modification of the associated side information.

While not explicitly described, the present embodiments related to the methods or to the corresponding electronic devices or communication system can be employed in any combination or sub-combination.

According to another aspect, the present disclosure relates to a non-transitory computer readable program product comprising program code instructions for performing, when the non-transitory software program is executed by a computer, at least one of the methods of the present disclosure, in any of its embodiments.

Notably, at least one embodiment of the present disclosure relates to a non-transitory computer readable program product comprising program code instructions for performing, when the non-transitory software program is executed by a computer, a method, implemented in an electronic device, the method comprising:
- obtaining an audio and/or video input content complying with a first format, the first format providing a representation of data in a first range of possible values;
- applying a first format modification to the input content, the first format modification being adapted to provide an output content complying with a second format, the second format providing a representation of data in a second range of possible values;
- associating to the output content side information comprising a designation of a first kind of format modification among several kinds of format modifications, the first kind of format modification being representative of range operations performed between values of the first and second ranges by the first format modification.

Also, at least one embodiment of the present disclosure relates to a non-transitory computer readable program product comprising program code instructions for performing, when the non-transitory software program is executed by a computer, a method, implemented in an electronic device, the method comprising:

obtaining an audio and/or video input content, the audio and/or video input content complying with an input format, the input format providing a representation of data in an input range of values, obtaining side information associated with the input content and comprising a designation of at least one first kind of format modification among several kinds of format modifications, the first kind of format modification being adapted to represent range operations performed between values of a first range and values of a second range by a first format modification;

determining whether to apply a second format modification to the input content by taking account of the first kind of format modification of the associated side information and, when a second format modification is needed on the input content, determining a kind of the second format modification by taking account of the first kind of format modification of the associated side information.

According to another aspect, the present disclosure relates to a computer readable storage medium carrying a software program comprising program code instructions for performing, when the non-transitory software program is executed by a computer, at least one of the methods of the present disclosure, in any of its embodiments.

According to an embodiment of the present disclosure, the computer readable storage medium tangibly embodies a program of instructions executable by a computer for performing, when the non-transitory software program is executed by a computer, a method, implemented in an electronic device, the method comprising:

obtaining an audio and/or video input content complying with a first format, the first format providing a representation of data in a first range of possible values;

applying a first format modification to the input content, the first format modification being adapted to provide an output content complying with a second format, the second format providing a representation of data in a second range of possible values;

associating to the output content side information comprising a designation of a first kind of format modification among several kinds of format modifications, the first kind of format modification being representative of range operations performed between values of the first and second ranges by the first format modification.

According to an embodiment of the present disclosure, the computer readable storage medium carries a software program comprising program code instructions, when the non-transitory software program is executed by a computer, a method, implemented in an electronic device, the method comprising:

obtaining an audio and/or video input content complying with a first format, the first format providing a representation of data in a first range of possible values;

applying a first format modification to the input content, the first format modification being adapted to provide an output content complying with a second format, the second format providing a representation of data in a second range of possible values;

associating to the output content side information comprising a designation of a first kind of format modification among several kinds of format modifications, the first kind of format modification being representative of range operations performed between values of the first and second ranges by the first format modification.

According to an embodiment of the present disclosure, the computer readable storage medium tangibly embodies a program of instructions executable by a computer for performing, when the non-transitory software program is executed by a computer, a method, implemented in an electronic device, the method comprising:

obtaining an audio and/or video input content, the audio and/or video input content complying with an input format, the input format providing a representation of data in an input range of values, obtaining side information associated with the input content and comprising a designation of at least one first kind of format modification among several kinds of format modifications, the first kind of format modification being adapted to represent range operations performed between values of a first range and values of a second range by a first format modification;

determining whether to apply a second format modification to the input content by taking account of the first kind of format modification of the associated side information and, when a second format modification is needed on the input content, determining a kind of the second format modification by taking account of the first kind of format modification of the associated side information.

According to an embodiment of the present disclosure, the computer readable storage medium carries a software program comprising program code instructions, when the non-transitory software program is executed by a computer, a method, implemented in an electronic device, the method comprising:

obtaining an audio and/or video input content, the audio and/or video input content complying with an input format, the input format providing a representation of data in an input range of values, obtaining side information associated with the input content and comprising a designation of at least one first kind of format modification among several kinds of format modifications, the first kind of format modification being adapted to represent range operations performed between values of a first range and values of a second range by a first format modification;

determining whether to apply a second format modification to the input content by taking account of the first kind of format modification of the associated side information and, when a second format modification is needed on the input content, determining a kind of the second format modification by taking account of the first kind of format modification of the associated side information.

According to another aspect, the present disclosure relates to a communication signal adapted to be transmitted via a communication network, the communication signal comprising an audio and/or video content, the audio and/or video content complying with an input format, the input format providing a representation of data in an input range of possible values, the input content being associated with side information comprising a designation of a first kind of format modification among several kinds of format modifications, the first kind of format modification being representative of range operations performed between values of a first range and values of the input range by a first format modification.

The present disclosure further relates, in at least some embodiments, to an electronic device comprising at least one processor, the at least one processor being adapted for:
 obtaining an audio and/or video input content complying with a first format, the first format providing a representation of data in a first range of values;
 applying a first format modification to the input content, the first format modification being adapted to provide an output content complying with a second format, the second format providing a representation of data in a second range of values;
 associating with the output content side information comprising a designation of the first format modification, wherein the first format modification includes at least an up-conversion, a down-conversion, a mapping, a clipping or a combination thereof, the first format modification being representative of range operations performed between values of the first and second ranges by the first format modification.

The present disclosure further relates, in at least some embodiments, to a method, implemented in an electronic device, the method comprising:
 obtaining an audio and/or video input content complying with a first format, the first format providing a representation of data in a first range of possible values;
 applying a first format modification to the input content, the first format modification being adapted to provide an output content complying with a second format, the second format providing a representation of data in a second range of possible values;
 associating with the output content side information comprising a designation of the first format modification, wherein the first format modification includes at least an up-conversion, a down-conversion, a mapping, a clipping or a combination thereof, the side information comprising data representative of range operations performed between values of the first and second ranges by the first format modification.

According to at least one embodiment, the first range of values is greater than the second range of values.

According to at least one embodiment, the first and second format are color formats.

According to another aspect, the present disclosure relates to an electronic device comprising at least one processor, the at least one processor being adapted for:
 obtaining an audio and/or video input content, the audio and/or video input content complying with an input format, the input format providing a representation of data in an input range of values,
 obtaining side information associated with the input content and comprising a designation of at least one first format modification, the first format modification including at least an up-conversion, a down-conversion, a mapping, a clipping or a combination thereof, the side information being adapted to represent range operations performed between values of a first range and values of a second range by the first format modification;
 determining a second format modification to apply to the input content by taking account of the first format modification of the associated side information.

The present disclosure further relates, according to at least one embodiment, to a method, implemented in an electronic device, the method comprising:
 obtaining an audio and/or video input content, the audio and/or video input content complying with an input format, the input format providing a representation of data in an input range of values,
 obtaining side information associated with the input content and comprising a designation of at least one first format modification, the first format modification including at least an up-conversion, a down-conversion, a mapping, a clipping or a combination thereof, the side information being adapted to represent range operations performed between values of a first range and values of a second range by the first format modification;
 determining a second format modification to apply to the input content by taking account of the first format modification of the associated side information.

According to at least one embodiment, the determining is performed conditionally, by taking account of the first format modification.

According to at least one embodiment, the at least one processor is adapted for, or the method comprises, outputting the output content on a user interface.

According to at least one embodiment, the at least one processor is adapted for, or the method comprises, updating the side information according to the applied second format transformation.

According to at least one embodiment, the second range is the input range.

According to at least one embodiment, determining the second format modification further takes account of an output range of values used for a forthcoming processing of the audio and/or input content.

According to at least one embodiment, the forthcoming processing comprises an output of at least a part of the audio and/or input content by a first audio and/or video rendering device.

According to at least one embodiment, the forthcoming processing comprises an insertion of at least a part of the audio and/or input content in another audio and/or video content using the output range of values.

According to another aspect, the present disclosure relates to a system comprising one or more electronic devices, a first electronic device of the one or more electronic devices comprising at least one processor adapted for:
 obtaining an audio and/or video input content complying with a first format, the first format providing a representation of data in a first range of values;
 applying a first format modification to the input content, the first format modification being adapted to provide an output content complying with a second format, the second format providing a representation of data in a second range of values;
 associating with the output content side information comprising a designation of the first format modification, wherein the first format modification includes at least an up-conversion, a down-conversion, a mapping, a clipping or a combination thereof, the side information comprising data representative of range operations performed between values of the first and second ranges by the first format modification.
a second electronic device of the one or more electronic devices comprising at least one processor adapted for:
 obtaining the audio and/or video output content,
 obtaining the side information associated with the output content
 determining a second format modification to apply to the output content by taking account of the first format modification of the associated side information.

According to another aspect, the present disclosure relates to a non-transitory computer readable program product comprising program code instructions for performing, when the non-transitory readable program product is executed by a computer, at least some embodiments of at least one of the methods of the present disclosure.

For instance, the present disclosure relates to a non-transitory computer readable program product comprising program code instructions for performing, when the non-transitory readable program product is executed by a computer, a method, implemented in an electronic device, the method comprising:

obtaining an audio and/or video input content complying with a first format, the first format providing a representation of data in a first range of possible values;
  applying a first format modification to the input content, the first format modification being adapted to provide an output content complying with a second format, the second format providing a representation of data in a second range of possible values;
  associating with the output content side information comprising a designation of the first format modification, wherein the first format modification includes at least an up-conversion, a down-conversion, a mapping, a clipping or a combination thereof, the side information comprising data representative of range operations performed between values of the first and second ranges by the first format modification.

The present disclosure also relates to a non-transitory computer readable program product comprising program code instructions for performing, when the non-transitory readable program product is executed by a computer, a method comprising:

obtaining an audio and/or video input content, the audio and/or video input content complying with an input format, the input format providing a representation of data in an input range of values,
  obtaining side information associated with the input content and comprising a designation of at least one first format modification, the first format modification including at least an up-conversion, a down-conversion, a mapping, a clipping or a combination thereof, the side information being adapted to represent range operations performed between values of a first range and values of a second range by the first format modification;
  determining a second format modification to apply to the input content by taking account of the first format modification of the associated side information.

According to another aspect, the present disclosure relates to a computer readable storage medium carrying a software program comprising program code instructions for performing, when the non-transitory software program is executed by a computer, at least one of the methods of the present disclosure, in any of its embodiments.

According to an embodiment of the present disclosure, the computer readable storage medium tangibly embodies a program of instructions executable by a computer for performing, when the non-transitory software program is executed by a computer, a method, implemented in an electronic device, the method comprising:

obtaining an audio and/or video input content complying with a first format, the first format providing a representation of data in a first range of possible values;
  applying a first format modification to the input content, the first format modification being adapted to provide an output content complying with a second format, the second format providing a representation of data in a second range of possible values;
  associating with the output content side information comprising a designation of the first format modification, wherein the first format modification includes at least an up-conversion, a down-conversion, a mapping, a clipping or a combination thereof, the side information comprising data representative of range operations performed between values of the first and second ranges by the first format modification.

According to an embodiment of the present disclosure, the computer readable storage medium carries a software program comprising program code instructions, when the non-transitory software program is executed by a computer, a method, implemented in an electronic device, the method comprising:

obtaining an audio and/or video input content complying with a first format, the first format providing a representation of data in a first range of possible values;
  applying a first format modification to the input content, the first format modification being adapted to provide an output content complying with a second format, the second format providing a representation of data in a second range of possible values;
  associating with the output content side information comprising a designation of the first format modification, wherein the first format modification includes at least an up-conversion, a down-conversion, a mapping, a clipping or a combination thereof, the side information comprising data representative of range operations performed between values of the first and second ranges by the first format modification.

According to an embodiment of the present disclosure, the computer readable storage medium tangibly embodies a program of instructions executable by a computer for performing, when the non-transitory software program is executed by a computer, a method, implemented in an electronic device, the method comprising:

obtaining an audio and/or video input content, the audio and/or video input content complying with an input format, the input format providing a representation of data in an input range of values,
  obtaining side information associated with the input content and comprising a designation of at least one first format modification, the first format modification including at least an up-conversion, a down-conversion, a mapping, a clipping or a combination thereof, the side information being adapted to represent range operations performed between values of a first range and values of a second range by the first format modification;
  determining a second format modification to apply to the input content by taking account of the first format modification of the associated side information.

According to an embodiment of the present disclosure, the computer readable storage medium carries a software program comprising program code instructions, when the non-transitory software program is executed by a computer, a method, implemented in an electronic device, the method comprising:

obtaining an audio and/or video input content, the audio and/or video input content complying with an input format, the input format providing a representation of data in an input range of values,
  obtaining side information associated with the input content and comprising a designation of at least one first format modification, the first format modification including at least an up-conversion, a down-conversion, a mapping, a clipping or a combination thereof, the side information being adapted to represent range operations performed between values of a first range and values of a second range by the first format modification;

determining a second format modification to apply to the input content by taking account of the first format modification of the associated side information.

According to another aspect, the present disclosure relates to a communication signal adapted to be transmitted via a communication network, the communication signal comprising an audio and/or video content, the audio and/or video content complying with an input format, the input format providing a representation of data in an input range of possible values, the input content being associated with side information comprising a designation of a first format modification, wherein the first format modification includes at least an up-conversion, a down-conversion, a mapping, a clipping or a combination thereof, the first format modification being representative of range operations performed between values of a first range and values of the input range.

As can be appreciated by one skilled in the art, aspects of the present principles can be embodied as a system, method, or computer readable medium. Accordingly, aspects of the present disclosure can take the form of a hardware embodiment, a software embodiment (including firmware, resident software, micro-code, and so forth), or an embodiment combining software and hardware aspects that can all generally be referred to herein as a "circuit", "module" or "system". Furthermore, aspects of the present principles can take the form of a computer readable storage medium. Any combination of one or more computer readable storage medium may be utilized.

A computer readable storage medium can take the form of a computer readable program product embodied in one or more computer readable medium and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer readable storage media to which the present principles can be applied, is merely an illustrative and not exhaustive listing as is readily appreciated by one of ordinary skill in the art: a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

Thus, for example, it can be appreciated by those skilled in the art that the block diagrams presented herein represent conceptual views of illustrative system components and/or circuitry of some embodiments of the present principles. Similarly, it can be appreciated that any flow charts, flow diagrams, state transition diagrams, pseudo code, and the like represent various processes which may be substantially represented in computer readable storage media and so executed by a computer or processor, whether such computer or processor is explicitly shown.

It is also to be pointed out that the at least some of embodiments can be combined together, even if not explicitly disclosed above.

The invention claimed is:

1. An electronic device comprising:
a processor configured to:
obtain video content, the video content having a first format;
obtain side information associated with the video content, the side information indicating a history of format modification comprising at least a first format modification and a second format modification, the first format modification and the second format modification previously performed on the video content, the first format modification having been performed before the second format modification, the side information comprising information indicating a number of format modifications previously performed on the video content, information indicating a first input format, a first output format, and a first modification type associated with the first format modification, and information indicating a second input format, a second output format, and a second modification type associated with the second format modification; and
determine, based on at least the first input format, the first output format, the first modification type associated with the first format modification, the second input format, the second output format, the second modification type associated with the second format modification, and an intended output format, a third format modification for application to the video content.

2. The electronic device of claim 1,
wherein the processor configured to determine the third format modification is configured to determine, on a condition the second format modification comprises clipping, that the third format modification comprises mapping.

3. The electronic device of claim 1,
wherein the processor configured to determine the third format modification is configured to determine the third format modification based at least in part on a type of format modification associated with at least one of the first format modification and the second format modification.

4. The electronic device of claim 1,
wherein the processor configured to determine the third format modification is configured to determine the third format modification based at least in part on a flag associated with at least one of the first format modification and the second format modification.

5. The electronic device of claim 4,
wherein the flag indicates a non-reversible format modification.

6. The electronic device of claim 1,
wherein the first format modification comprises a clipping modification and the second format modification comprises an up-converting modification.

7. The electronic device of claim 1,
wherein the first format modification comprises a mapping modification and the second format modification comprises a down-converting modification.

8. The electronic device of claim 1,
wherein said third format modification comprises one or more of an up-conversion, a down-conversion, a mapping, and a clipping.

9. The electronic device of claim 1,
wherein the processor is further configured to:
update the side information to further indicate the third format modification has been performed on the video content.

10. The electronic device of claim 1,
wherein the processor is further configured to:
apply the third format modification to the video content; and
output the video content for display.

11. A method comprising:
obtaining video content, the video content having a first format;
obtaining side information associated with the video content, the side information indicating a history of format modification comprising at least a first format modification and a second format modification, the first format modification and the second format modification previously performed on the video content, the first format modification having been performed before the second format modification, the side information comprising information indicating a number of format modifications previously performed on the video content, information indicating a first input format, a first output format, and a first modification type associated with the first format modification, and information indicating a second input format, a second output format, and a second modification type associated with the second format modification; and
determining, based on at least the first input format, the first output format, the first modification type associated with the first format modification, the second input format, the second output format, the second modification type associated with the second format modification, and an intended output format, a third format modification for application to the video content.

12. The method of claim 11,
wherein determining the third format modification comprises determining, on a condition the second format modification comprises clipping, that the third format modification comprises mapping.

13. The method of claim 11,
wherein determining the third format modification comprises determining the third format modification based at least in part on a type of format modification associated with at least one of the first format modification and the second format modification.

14. The method of claim 11,
wherein determining the third format modification comprises determining the third format modification based at least in part on a flag associated with at least one of the first format modification and the second format modification.

15. The method of claim 14,
wherein the flag indicates a non-reversible format modification.

16. The method of claim 11,
wherein the first format modification comprises a clipping modification and the second format modification comprises an up-converting modification.

17. The method of claim 11,
wherein the first format modification comprises a mapping modification and the second format modification comprises a down-converting modification.

18. The method of claim 11, further comprising:
updating the side information to further indicate the third format modification has been performed on the video content.

19. The method of claim 11, further comprising:
applying the third format modification to the video content; and
outputting the video content for display.

20. Non-transitory computer-readable storage medium having stored thereon program instructions that, when executed by a computing device, cause the computing device to perform a method comprising:
obtaining video content, the video content having a first format;
obtaining side information associated with the video content, the side information indicating a history of format modification comprising at least a first format modification and a second format modification, the first format modification and the second format modification previously performed on the video content, the first format modification having been performed before the second format modification, the side information comprising information indicating a number of format modifications previously performed on the video content, information indicating a first input format, a first output format, and a first modification type associated with the first format modification, and information indicating a second input format, a second output format, and a second modification type associated with the second format modification; and
determining, based on at least the first input format, the first output format, the first modification type associated with the first format modification, the second input format, the second output format, the second modification type associated with the second format modification, and an intended output format, a third format modification for application to the video content.

* * * * *